United States Patent
Marquardt et al.

(10) Patent No.: US 9,608,759 B2
(45) Date of Patent: Mar. 28, 2017

(54) OPTICAL COMMUNICATION SYSTEM WITH HARDWARE ROOT OF TRUST (HROT) AND NETWORK FUNCTION VIRTUALIZATION (NFV)

(71) Applicant: Sprint Communications Company L.P., Overland Park, KS (US)

(72) Inventors: Ronald R. Marquardt, Woodinville, WA (US); Lyle Walter Paczkowski, Mission Hills, KS (US); Arun Rajagopal, Leawood, KS (US)

(73) Assignee: Sprint Communications Company L.P., Overland Park, KS (US)

(*) Notice: Subject to any disclaimer, the term of this patent is extended or adjusted under 35 U.S.C. 154(b) by 34 days.

(21) Appl. No.: 14/719,026

(22) Filed: May 21, 2015

(65) Prior Publication Data

US 2016/0344507 A1    Nov. 24, 2016

(51) Int. Cl.
   *H04B 10/27*    (2013.01)
   *H04J 14/02*    (2006.01)
(52) U.S. Cl.
   CPC .......... *H04J 14/0227* (2013.01); *H04B 10/27* (2013.01)
(58) Field of Classification Search
   USPC ............................................ 713/171; 726/15
   See application file for complete search history.

(56) References Cited

U.S. PATENT DOCUMENTS

| | | |
|---|---|---|
| 8,050,409 B2 | 11/2011 | Agrawal et al. |
| 8,494,576 B1 | 7/2013 | Bye et al. |
| 8,504,097 B1 | 8/2013 | Cope et al. |
| 8,649,770 B1 | 2/2014 | Cope et al. |
| 8,667,607 B2 | 3/2014 | Paczkowski et al. |
| 8,752,160 B1 | 6/2014 | Delker et al. |
| 8,819,447 B2 | 8/2014 | Shipley et al. |
| 2005/0177749 A1 | 8/2005 | Ovadia |
| 2010/0311401 A1 | 12/2010 | Oh et al. |
| 2013/0322443 A1 | 12/2013 | Dunbar et al. |

(Continued)

OTHER PUBLICATIONS

"Network Functions Virtualisation (NFV); Ecosystem; Report on SDN Usage in NFV Architectural Framework;" Group Specification; Apr. 8, 2015; pp. 1-78; Draft ETSI GS NFV-EVE005 V0.0.5; ETSI; Sophia Antipolis Cedex, France.

*Primary Examiner* — Danny Leung
*Assistant Examiner* — Omar S Ismail (57) ABSTRACT

An Internet Protocol/Wave Division Multiplex (IP/WDM) network implements Hardware Root of Trust (HRoT) and Network Function Virtualization (NFV). An NFV server generates and transfers IP control data and WDM control data to IP/WDM machines. The IP/WDM machines exchange IP packets between IP ports and WDM interfaces based on the IP control data. The IP/WDM machines exchange the IP packets between the WDM interfaces and WDM ports based on the WDM control data. The IP/WDM machines transmit and receive the IP packets from the WDM ports using different optical wavelengths. The IP/WDM machines transfer HRoT data indicating the optical wavelengths used to exchange the IP packets and indicating encoded hardware keys physically-embedded on the IP/WDM machines. The NFV server receives the HRoT data and process the encoded hardware keys and the optical wavelengths to validate HRoT status of the IP/WDM machines.

18 Claims, 7 Drawing Sheets

(56) References Cited

U.S. PATENT DOCUMENTS

| | | |
|---|---|---|
| 2013/0345530 A1 | 12/2013 | McRoberts et al. |
| 2014/0047548 A1 | 2/2014 | Bye et al. |
| 2014/0099119 A1* | 4/2014 | Wei .................... H04J 14/0227 398/79 |
| 2014/0181267 A1 | 6/2014 | Wadkins et al. |
| 2014/0201374 A1 | 7/2014 | Ashwood-Smith et al. |
| 2014/0229945 A1 | 8/2014 | Barkai et al. |
| 2014/0241247 A1 | 8/2014 | Kempf et al. |
| 2014/0259012 A1 | 9/2014 | Nandlall et al. |
| 2014/0304516 A1* | 10/2014 | Fahrny ................. H04L 9/3247 713/176 |

* cited by examiner

OPTICAL COMMUNICATION SYSTEM WITH HARDWARE ROOT OF TRUST (HROT) AND NETWORK FUNCTION VIRTUALIZATION (NFV)

TECHNICAL BACKGROUND

Internet Protocol (IP) communication systems transfer IP packets among user devices and intelligent machines to provide data communication services like internet access, file transfers, media streaming, and user messaging. The IP communication systems are implementing several technologies in a contemporaneous manner to improve service delivery. These technologies include systems for Hardware Root-of-Trust (HRoT), Network Function Virtualization (NFV), and Software-Defined Networks (SDNs).

The HRoT systems ensure network security and control. The HRoT systems maintain physical separation between trusted hardware and untrusted hardware. The HRoT systems control software access to the trusted hardware but allow interaction between open and trusted software components through secure bus interfaces, memories, and switching circuits. The HRoT systems establish HRoT with one another by using secret HRoT keys physically embedded in their hardware to generate hash results for remote verification by other HRoT systems that know the secret HRoT keys and hash algorithms.

The NFV systems increase capacity and efficiency. NFV computer platforms run hypervisor software to execute various software modules during different processing time slices or on different processing cores. The software modules often comprise virtual machines, such as virtual IP routers, network elements, and the like. Different networks are mapped to different NFV cores or time slices to isolate the networks from one another.

The SDN systems improve service provisioning and management. SDNs have separate control and data planes. SDN controllers interact with SDN applications to control SDN data plane machines. The SDN applications process application-layer data to direct the SDN controllers, and in response, the SDN controllers direct the SDN data plane machines to process and transfer IP packets. The SDN applications may comprise gateways, servers, and the like.

Optical Transport Networks (OTNs) use dense wave division multiplexing to transfer IP packets. Different optical wavelengths and fibers may be dedicated to particular networks. Thus, Virtual Private Networks (VPNs) are deployed on the OTNs by using subnetworks of optical fibers and wavelengths. Unfortunately, optical networks that transfer IP packets have not integrated HRoT, NFV, and SDN systems to form more efficient and effective optical communication networks.

Technical Overview

An Internet Protocol/Wave Division Multiplex (IP/WDM) network implements Hardware Root of Trust (HRoT) and Network Function Virtualization (NFV). An NFV server generates and transfers IP control data and WDM control data to IP/WDM machines. The IP/WDM machines exchange IP packets between IP ports and WDM interfaces based on the IP control data. The IP/WDM machines exchange the IP packets between the WDM interfaces and WDM ports based on the WDM control data. The IP/WDM machines transmit and receive the IP packets from the WDM ports using different optical wavelengths. The IP/WDM machines transfer HRoT data indicating the optical wavelengths used to exchange the IP packets and indicating encoded hardware keys physically-embedded on the IP/WDM machines. The NFV server receives the HRoT data and process the encoded hardware keys and the optical wavelengths to validate HRoT status of the IP/WDM machines.

DETAILED DESCRIPTION

FIGS. 1-4 illustrate Internet Protocol/Wave Division Multiplex (IP/WDM) communication data network 100 with Hardware Root of Trust (HRoT) and Network Function Virtualization (NFV). As used herein, the acronym "WDM" includes various forms of wavelength multiplexing including Dense Wavelength Division Multiplexing (DWDM). IP/WDM network 100 comprises NFV servers 111-114 and IP/WDM machines 121-132.

IP/WDM machines 125-132 are coupled to data devices over IP links that are shown with solid lines and arrows. NFV servers 111-114 are coupled to IP/WDM machines 121-126 over IP links, such as IP link 101 between NFV server 111 and IP/WDM machine 121. IP/WDM machines 121-125 are coupled to one another by optical fibers that are shown with dotted lines, such as optical fibers 102 between IP/WDM machines 121-122. Each optical fiber transports multiple optical wavelengths in parallel as shown by the dotted lines. The illustrative optical fibers may include regenerators and other support systems that are omitted for clarity.

NFV servers 111-114 transfer IP control data and WDM control data to IP/WDM machines 121-132. IP/WDM machines 121-132 store the control data for handling subsequent IP/WDM communications. IP/WDM machines 121-132 then form IP communication paths between data devices like servers, computers, intelligent machines, or some other data processing apparatus. Some of the IP paths may traverse NFV servers 111-114 for the application of data services like transcoding, filtering, accounting, and the like. In some examples, unique IP address prefixes are individually associated with specific WDM wavelengths to create special IP/WDM subnetworks within network 100. These special IP/WDM subnetworks may be further isolated from one another by using different NFV server resources like different processing cores, time slices, ports, and data memories.

IP/WDM machines 121-132 have HRoT systems to exert physical control over software access to their hardware like data processors, memories, and ports. IP/WDM machines 121-132 process physically-embedded HRoT keys and return the processing results to the master HRoT data system for HRoT verification. In this example, NFV server 111 hosts the master HRoT data system. In some examples, HRoT-dedicated IP address prefixes are individually associated with HRoT-dedicated WDM wavelengths to create an HRoT subnetwork within network 100. The HRoT subnetwork can be further isolated from other networks by using HRoT-dedicated resources like HRoT-dedicated processing cores, time slices, ports, and data memories. NFV servers 111-114 and IP/WDM machines 121-132 exchange HRoT challenges, responses, and other data over the HRoT subnet. NFV servers 111-114 and IP/WDM machines 121-132 may exchange IP control data and WDM control data over the HRoT subnet or another protected subnet.

Initially, data devices transfer IP packets to edge IP/WDM machines 125-132 for delivery to destination data devices. IP/WDM machines 125-132 exchange some of these IP packets with the destination data devices—often requiring an intermediate transfer through additional IP/WDM machines. For example, an IP/WDM path between data devices may traverse IP/WDM machines 125-121-126. On the transfer through IP/WDM machines 125-121-126, the IP packets are optically groomed and may be switched at the WDM frame level or routed at the IP packet level. On the transfer through IP/WDM machine 121, some of the IP packets may be processed by NFV server 111 to apply additional data services, such as media transcoding, data filtering, and accounting.

IP/WDM machines 121-132 transfer HRoT data indicating encoded versions of their physically embedded HRoT keys and indicating the optical wavelengths used to transfer the IP packets. The HRoT data may also indicate the optical fibers and IP prefixes used for these IP packet transfers. The master HRoT system in NFV server 111 processes the HRoT data from IP/WDM machines 121-132 to validate HRoT status of IP/WDM network 100. To perform the validation, NFV server 111 may use the same random numbers, hash algorithms, and hardware keys as IP/WDM machines 121-132.

NFV server 111 also processes the HRoT data to verify that the appropriate optical fibers, optical wavelengths, and IP prefixes were used to transfer the IP packets. To determine appropriateness, NFV server 111 may compare the actual use of the optical fibers, optical wavelengths, and IP prefixes for the data devices and IP/WDM machines to virtual network data that individually associates appropriate combinations of optical fibers, optical wavelengths, IP prefixes, data devices, and IP/WDM machines, and the like.

In some examples, NFV servers 111-114 transfer HRoT data indicating encoded versions of their physically embedded hardware keys and the NFV processing resources (cores/slices/ports) used to generate the control data or apply the data services. The HRoT system may process this HRoT data to verify that the appropriate NFV servers, cores, time slices, memories, and ports were used to service and transfer the IP packets. IP/WDM machines 121-132 may also use an NFV processing environment and facilitate HRoT verification of this NFV data.

Figure 1:
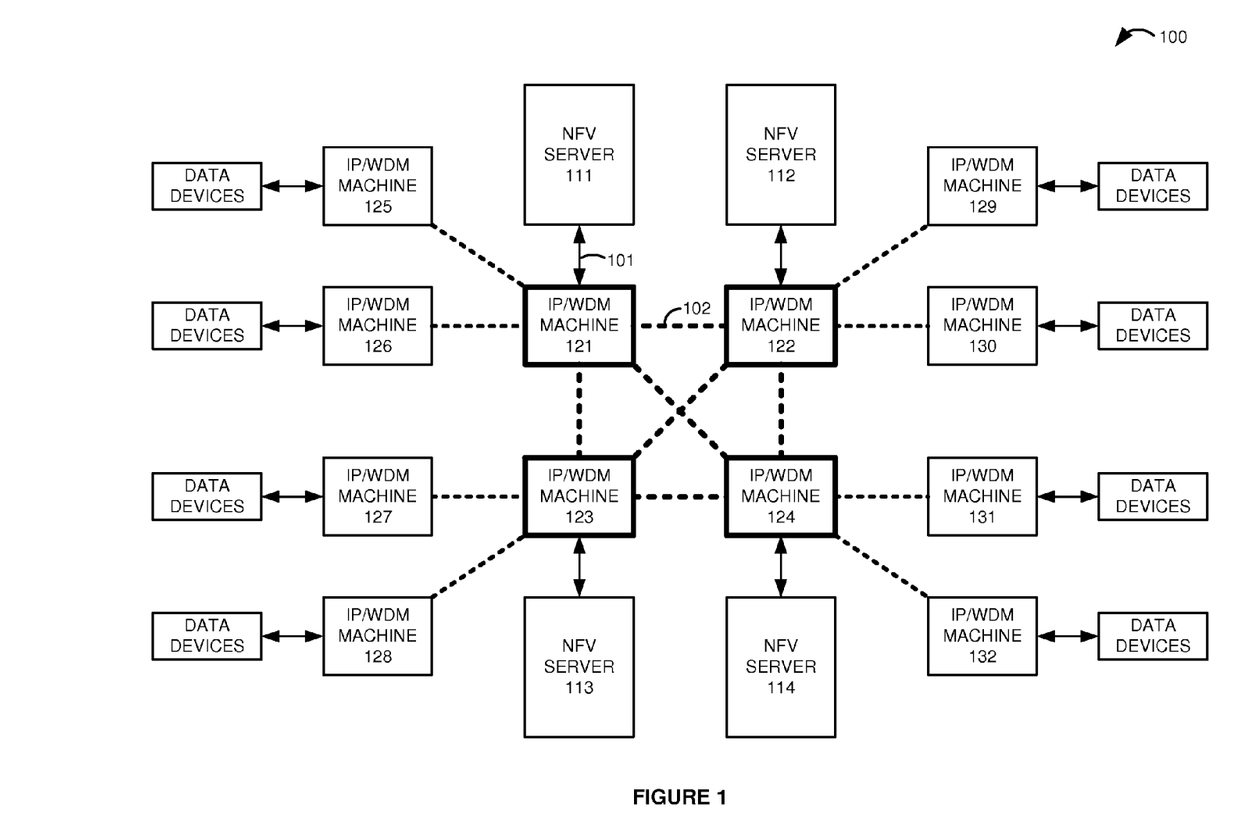
FIGS. 1-4 illustrate an Internet Protocol/Wave Division Multiplex (IP/WDM) communication network with Hardware Root of Trust (HRoT) and Network Function Virtualization (NFV).
Figure 2:
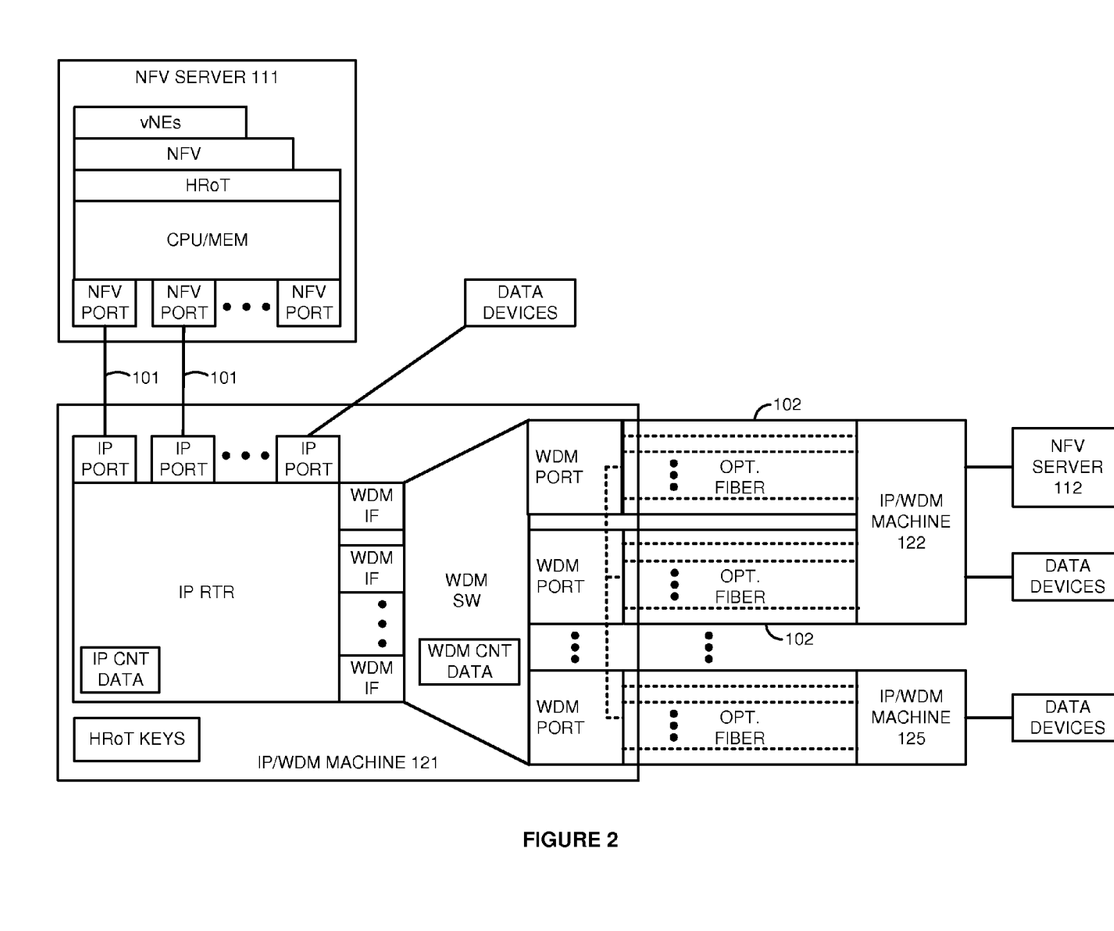

FIG. 2 illustrates NFV server 111 and IP/WDM machine 121. NFV servers 112-114 and IP/WDM machines 122-132 are the same or similar. NFV server 111 comprises server ports, Central Processing Units (CPUs), memory devices, HRoT software, NFV software, and virtual Network Element (vNE) software. IP/WDM machine 121 comprises IP ports, IP router, IP/WDM interfaces, WDM switch, and WDM ports. IP/WDM machine 121 has physically embedded HRoT keys in its CPUs and possibly in its memory devices and ports as well. NFV server 111 may also have similar physically embedded HRoT keys.

The NFV server ports comprise physical couplings and processing circuitry that transfer electro-magnetic signals comprising IP packets. Some of the IP packets transport other communication protocols such as Optical Transport Network (OTN) signaling, SDN flow control, and the like. The NFV CPUs comprise electronic processing circuitry having transistors, registers, and signal paths. The NFV memory devices comprise flash drives, disc drives, tape drives, read-only circuitry, or some other data storage media.

The NFV software generates a multi-threaded data processing environment where the software execution of various software modules is controlled and distributed across various data processing time slices, CPU cores, CPUs, memories, and/or servers—including combinations thereof. The NFV software allocates these data processing resources to the vNEs to form virtual networks. The vNEs in a given virtual network often share common NFV data processing resources that are physically isolated from other virtual networks in the NFV space and/or time domains. The vNEs in this virtual network may also share common IP address prefixes and optical wavelengths for additional isolation.

In IP/WDM machine 121, the IP ports and WDM interfaces comprise physical couplings and processing circuitry that transfer electro-magnetic signals comprising IP packets. Some of the IP packets transport other communication protocols such as OTN signaling, SDN flow control, and the like. The IP router has IP control data, such as route information blocks, and SDN flow tables. The IP router routes IP packets between the IP ports and the WDM interfaces based on the IP control data.

The WDM interfaces comprise processing circuitry and memory to convert between IP and IP/WDM formats in the electrical domain. The WDM interfaces typically encapsulate and decapsulate IP packets within WDM frames, such as G.709 data blocks or Ethernet packets. The WDM frames have identifiers (IDs), and some WDM frame IDs correspond to specific WDM ports, fibers, and wavelengths. IP prefixes and addresses can be associated with WDM frame IDs, so IP prefixes and IP addresses may be associated with specific WDM ports, fibers, and wavelengths. The associated IP prefixes and WDM wavelengths may be further associated with NFV cores, slices, memories, and ports. This associated IP, WDM, and NFV data may be further associated with HRoT status for the hardware. In addition, the IP, WDM, NFV, and HRoT data may be further associated with vNEs to form complex virtual networks on the physical optical network. Some of these vNEs may be SDN controllers and SDN applications.

The WDM switch has WDM control data, such as frame ID/port/fiber/wavelength assignments, SDN flow tables, G.709 control data, Ethernet switching data, and the like. The WDM switch transfers WDM frames (transporting the IP packets) between the WDM interfaces and the WDM ports based on the WDM control data. WDM frame switching is often used to switch an IP flow from one wavelength or fiber to another, especially in cases of virtual network configuration and restoration. For example, if an optical port or fiber were to fail, WDM frame switching at each end of the failure could quickly replace the failed optical port or fiber.

The WDM ports comprise processing circuitry, memory, and optical transceivers to convert between the electronic and optical WDM formats. The WDM ports transmit WDM frames over specific optical WDM wavelengths based in the WDM frame IDs. The WDM ports may have optical components to amplify and transfer specific optical wavelengths directly between optical fibers.

The IP router comprises a computer system with IP software. The WDM switch comprises a computer system with WDM software. The IP router and the WDM switch may be discrete systems or share computers, server blades, backplanes, CPUs, memories, and the like. For example, the IP router and WDM switch may use separate processing cores or time slices in the same CPU. In some examples, the IP router and/or WDM switch comprise vNEs in an NFV environment. The virtual networks may then comprise special combinations of vNEs, servers, cores, time slices, memories, and ports that transfer data through IP/WDM machine 121. The HRoT system in IP/WDM machine 121 can transfer this NFV data to the master HRoT system for additional HRoT verification.

In IP/WDM machine 121, HRoT software asserts initial control over the CPUs, memories, and ports. In some examples, the HRoT software is integrated within the CPU kernel (Ring 0) or is executed with primary access to the CPU kernel. The HRoT software implements tightly controlled data-access between the hardware (CPUs, memories, ports) and the software (IP routing and WDM switching). The HRoT software allows the appropriate IP/WDM software to access the CPUs, memories, and ports.

In some examples, the IP control data and the WDM control data are provided by the vNEs in NFV server 111. The vNEs may comprise SDN controllers and SDN applications. Exemplary SDN applications include WDM networking applications, IP networking applications, IP/WDM orchestrator applications, IP/WDM network recovery applications, or some other IP/WDM networking software.

In operation, NFV server 111 executes vNEs to transfer IP control data and WDM control data to IP/WDM machine 121. IP/WDM machine 121 exchanges IP packets with data devices through its IP ports. IP/WDM machine 121 transfers the IP packets through the IP router between the IP ports and the WDM interfaces based on the IP control data. IP/WDM machine 121 transfers the IP packets through the WDM switch between the WDM interfaces and the WDM ports based on the WDM control data. The WDM ports transfer the IP packets over their assigned optical wavelengths in the connected optical fibers. A reciprocal process occurs for optical signals received into the WDM ports.

IP/WDM machine 121 transfers HRoT data indicating encoded versions of its physically embedded hardware keys. IP/WDM machine 121 transfers HRoT data indicating the optical fibers and wavelengths used to exchange the IP packets. IP/WDM machine 121 may transfer NFV data for the actual data transfers. The HRoT data system in NFV server 111 processes the HRoT data from IP/WDM machine 121 to validate HRoT status of IP/WDM network 100. In particular, the HRoT system processes the encoded hardware keys to verify HRoT for IP/WMD machine 121. For additional HRoT verification, the HRoT system also processes the IP addressing, optical fibers, and optical wavelengths to determine if the appropriate network resources were used to transfer the IP packets.

In some cases, IP/WDM machines 121-125 transfer some of the IP packets to NFV servers 111-114 to apply additional data services, such as media transcoding, data filtering, and accounting. When NFV servers 111-114 apply data services to IP packets, the NFV HRoT data may also indicate the NFV resources (servers, cores, slices, memories) used to exchange and serve these IP packets. For additional HRoT verification, the HRoT data system processes the NFV resource data to determine if the appropriate servers, cores, time slices, and memories were used to transfer the IP packets through NFV servers 111-114.

The HRoT system in NFV server 111 can monitor the network integrity by checking HRoT status and also by verifying the actual IP, WDM, NFV, vNE, and SDN components in a particular virtual optical network against expected and trusted component values. For example, NFV server 111 could verify that a given virtual optical network was using the proper: IP/WDM machines, optical fibers/wavelengths, IP prefixes/addresses, NFV cores/time slices/memories/ports, and software.

Figure 3:
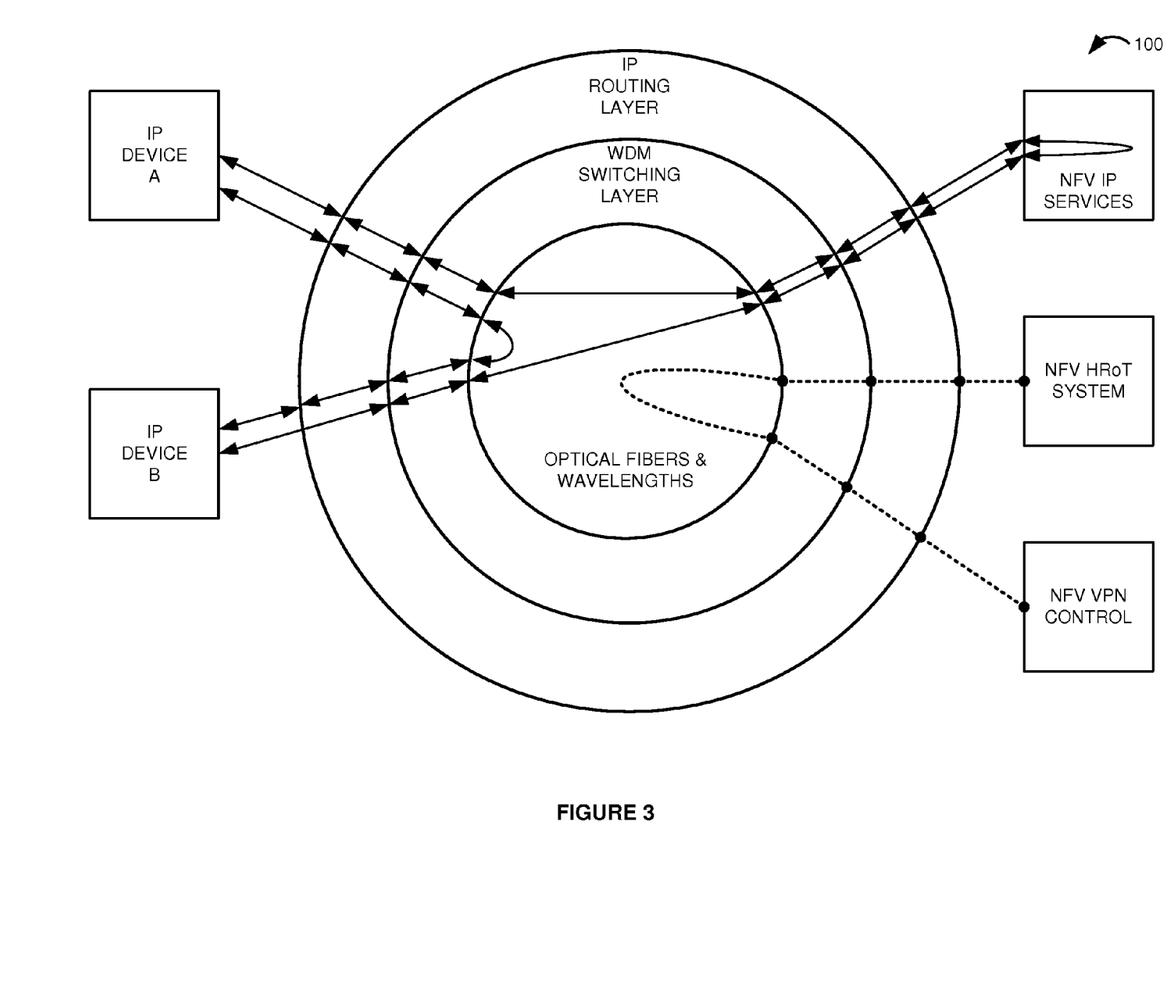

FIG. 3 illustrates networking aspects of IP/WDM network 100. The solid lines with arrows show two IP communication paths between IP device A and IP device B. One of the IP communication paths traverses an NFV server for the application of IP services, like filtering, accounting, security, transcoding, load balancing, and the like. The other IP communication path directly couples IP devices A and B.

To use the IP communication paths, IP devices A and B transfer IP packets to IP ports in the IP routing layer of the IP/WDM machines. Based on the IP addressing and IP ports for these IP packets, the IP/WDM machines route the IP packets to the WDM switching layer, although IP packets could be routed back to the data devices in other examples. Based on the IP and WDM addressing and the WDM interfaces, the IP/WDM machines switch WDM frames transporting the IP packets to the WDM ports and their corresponding optical fibers and wavelengths.

The IP packets from IP devices A and B traverse the optical fibers over their designated optical wavelengths to the WDM switching layer in far-end IP/WDM machines. On the direct IP communication path, the far-end IP/WDM machines process the IP and WDM addressing to transfer the IP packets through their WDM and IP layers to the far-end IP devices A and B. On the NFV communication path, the NFV IP/WDM machines process the IP and WDM addressing to transfer the IP packets through their WDM and IP layers to an NFV server for IP services. After the IP services, the IP packets traverse the IP routing, WDM switching, and optical wavelengths to the far-end IP/WDM machines that transfer the IP packets through their WDM switching and IP routing layers to the far-end IP devices A and B.

Based on the IP addressing, various IP/WDM communication paths may be established between the data devices. Some of the communication paths may traverse IP service nodes in NFV servers. Different virtual networks may utilize dedicated WDM wavelengths to provide isolation at the optical layer. Different virtual networks may utilize dedicated IP prefixes to map between their IP prefixes and dedicated WDM frame IDs and dedicated WDM wavelengths. The virtual networks may be further protected by using dedicated NFV resources, like processing cores, time slices, and memories. The virtual networks are also protected by using HRoT to control and verify hardware integrity.

The VPN control systems transfer IP and WDM control data to direct IP routing and WDM switching in the IP/WDM machines. For example, an SDN controller in the NFV system may transfer southbound control data to IP/WDM machines to implement a VPN. The VPN systems also transfer HRoT data associating the virtual network elements with their virtual networks and virtual network rules, such as the requirements for dedicated CPU cores, optical wavelengths, and the like. The NFV systems transfer HRoT data indicating encoded hardware keys and the allocations of NFV resources to the virtual network elements.

The IP and WDM layers in the IP/WDM machines also transfer HRoT data indicating encoded hardware keys and the allocations of resources to the IP addresses and WDM frame IDs. For example, an IP/WDM machine may transfer HRoT data indicating the combinations of IP prefixes, WDM wavelengths, and optical fibers that are actually being used to transfer the IP packets.

The HRoT system verifies the encoded hardware IDs for the NFV servers and the IP/WDM machines. The HRoT system verifies that virtual networks are actually using their designated IP prefixes, optical wavelengths, optical fibers, IP/WDM machines, and NFV servers. The HRoT system may further verify that the virtual networks are actually using their designated CPU cores, memories, ports, time slices, and virtual network elements within the NFV servers and IP/WDM machines.

Figure 4:
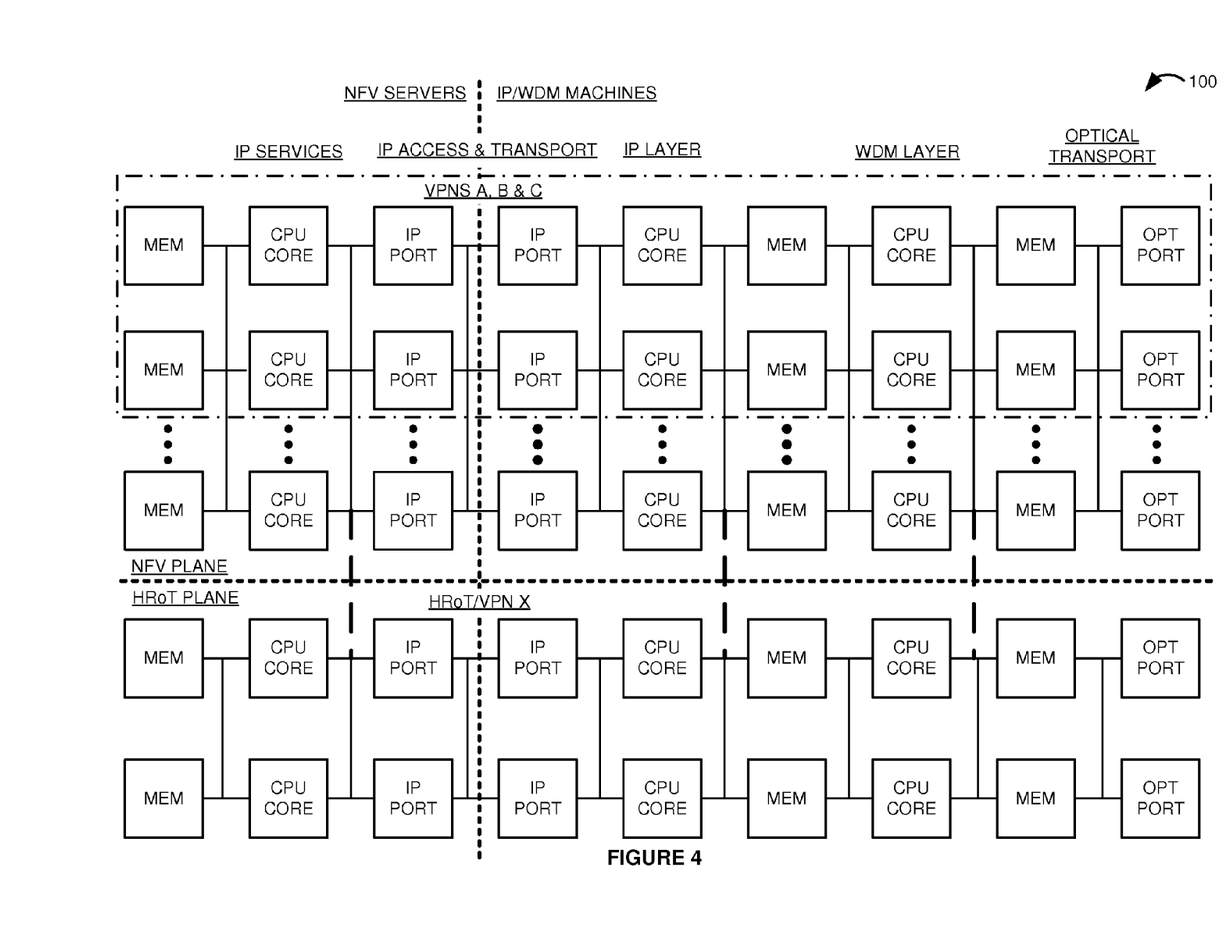

FIG. 4 illustrates hardware aspects of IP/WDM network 100. FIG. 4 is an exemplary illustration to teach innovative principles, and the actual hardware configuration would vary based on design requirements. Note the hardware separation between the NFV servers on the left and the IP/WDM machines on the right that are coupled by IP ports that provide IP access and transport. Also note the hardware separation between the NFV plane on the top and the HRoT plane on the bottom that is established by the HRoT system at start-up. The HRoT plane exerts direct control over the fourth and fifth rows of hardware while allocating the other rows to the NFV system to allocate to VPNs A, B, C and other networks. Data communications between the NFV plane and the HRoT plane occur through HRoT bus interfaces.

The HRoT plane hosts HRoT and VPN software with its own physical IP/WDM subnetwork VPN X. The NFV plane hosts hypervisor and virtual network element software where the hypervisor allocates dedicated hardware to VPNs A, B, and C while allowing other networks to use the other hardware. Thus, the hypervisors can also establish physical IP/WDM subnetworks A, B, and C.

The NFV plane performs IP routing and other services using multiple memories and CPU cores. The NFV CPU cores utilize the NFV IP ports to access IP transport to the IP/WDM machines. Although the software layer is not shown for clarity, NFV hypervisors allocate NFV resources (memories, cores, ports) to various software modules and virtual network elements. Thus, the NFV hypervisors may allocate dedicated memories, cores, and ports to VPNs A, B, and C.

The IP/WDM machines perform IP routing and WDM switching using multiple memories and CPU cores. The machine CPU cores utilize the IP ports to exchange IP traffic with both data devices and NFV servers. The HRoT system exerts direct control over the fourth and fifth rows of hardware in the IP/WDM machines while allocating the other rows to the IP and WDM systems to support VPNs A, B, C. If NFV is used in the IP/WDM machines, machine hypervisors may further allocate the memories, cores, and ports to various software modules and virtual network elements to form subnetworks.

User data devices exchange IP packets with the IP ports in the IP/WDM machines. The IP layer CPU cores in the IP/WDM machines exchange the IP packets between the IP ports and memories that also serve the WDM layer. The WDM layer CPU cores exchange WDM frames transporting the IP packets between these memories and optical ports. The optical ports exchange the IP/WDM data blocks over optical wavelengths within the optical fibers.

The CPU cores, memories, and ports execute HRoT software to transfer HRoT data indicating encoded versions of their physically embedded HRoT keys. The CPU cores, memories, and ports execute additional HRoT software to report HRoT data indicating the combinations of IP prefixes, optical wavelengths, and optical fibers used to transfer the IP packets. The master HRoT system operating on the NFV side processes the HRoT data from the IP/WDM machines to validate HRoT status of IP/WDM network 100.

Figure 5:
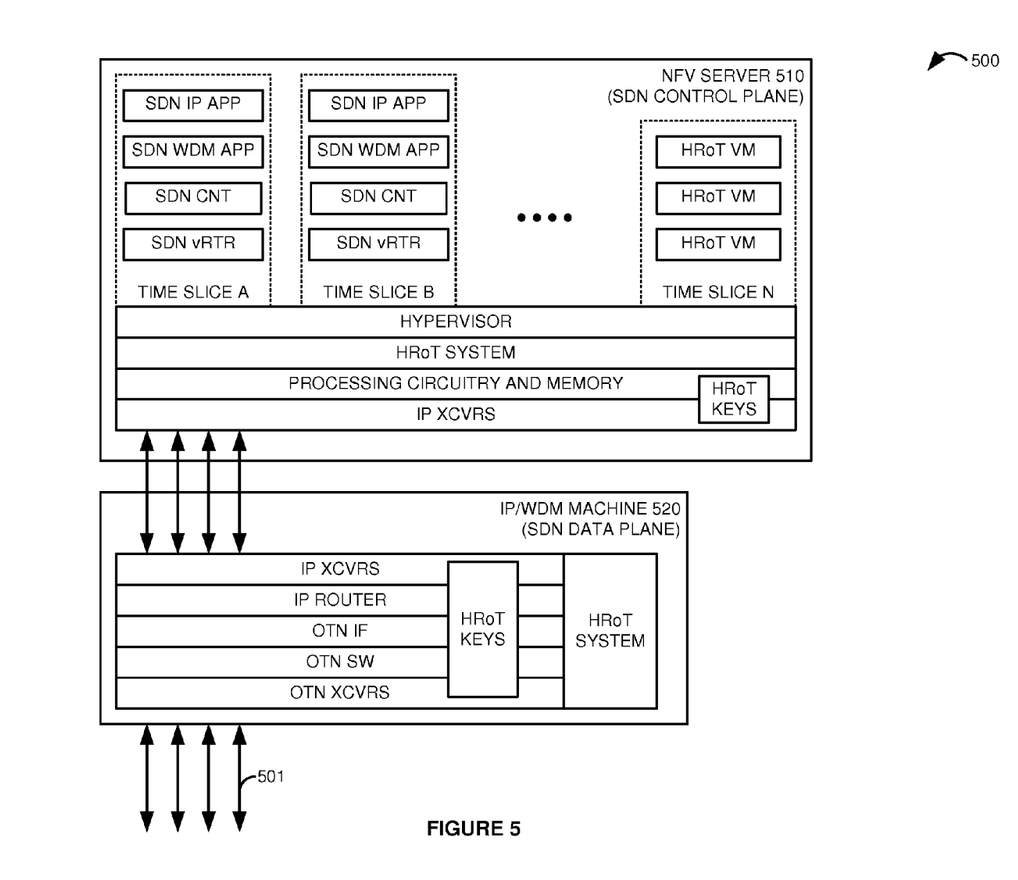
FIG. 5 illustrates an IP/WDM Software-Defined Network (SDN) with HRoT and NFV.

FIG. 5 illustrates IP/WDM Software-Defined Network (SDN) 500 to implement HRoT and NFV. IP/WDM SDN 500 comprises NFV server 510 and IP/WDM machine 520. NFV server 510 represents the SDN control plane and IP/WDM machine 520 represents the SDN data plane. Additional NFV servers and/or IP/WDM machines could be added to form various network configurations including IP/WDM network 100.

NFV server 510 comprises IP transceivers, processing circuitry, and memory that have embedded HRoT keys. An HRoT software system exerts initial control over the IP transceivers, processing circuitry, and memory. The HRoT system then runs a hypervisor to generate an NFV data environment. In this example, the hypervisor generates NFV time slices for allocation to virtual machines, containers, network elements, and the like.

In NFV time slice A, the processing circuitry and memory execute an SDN IP application, SDN WDM application, SDN controller, and SDN virtual router. The IP application and the WDM application generate northbound control data for the SDN controller. The SDN controller processes the northbound application data to generate southbound IP control data and WDM control data. The SDN controller transfers the southbound control data to the SDN virtual router for physical transfer through the IP transceivers to IP/WDM machine 520—and perhaps other IP/WDM machines. This combination of SDN software in NFV time slice A forms a virtual network within IP/WDM network 500. Likewise, the combination of SDN software in NFV time slice B forms another virtual network within IP/WDM network 500.

In NFV time slice N, the processing circuitry and memory execute HRoT Virtual Machines (VMs). Some HRoT VMs may read, encode, and transfer the HRoT keys. Some HRoT VMs may verify the encoded HRoT keys from other HRoT VMs. Some HRoT VMs may exchange HRoT data with the SDN software in NFV time slices A and B. This SDN HRoT data would indicate the combinations of prefixes, wavelengths, and fibers that comprise the virtual networks. Some HRoT VMs may exchange HRoT data with the hypervisor. This NFV HRoT data would indicate the combinations of time slices, processing circuitry, memory, and transceivers used to execute the SDN software. Together, the SDN and NFV HRoT data associates combinations of virtual networks, SDN software, IP prefixes, WDM wavelengths, optical fibers, NFV time slices, NFV circuitry, NFV memory, and NFV transceivers.

Some HRoT VMs may exchange HRoT data with IP/WDM machine 520. This machine HRoT data indicates the combinations of machine transceivers, machine routers, machine switches, IP prefixes, WDM wavelengths, and optical fibers used to transfer IP packets through machine 520. Some HRoT VMs may verify the integrity of virtual networks by comparing the actual network resources and parameters against the trusted resources and parameters like: SDN software, IP prefixes, WDM wavelengths, optical fibers, NFV time slices, NFV circuitry, NFV memory, NFV transceivers, IP/WDM transceivers, IP/WDM routers, and IP/WDM switches.

IP/WDM machine 520 comprises IP transceivers, IP router circuitry and memory, Optical Transport Network (OTN) interfaces, OTN switch circuitry and memory, and OTN transceivers. The IP transceivers, IP router circuitry and memory, OTN interfaces, OTN switch circuitry and memory, and OTN transceivers each have physically-embedded HRoT keys. An HRoT software system exerts initial control over the IP transceivers, IP router circuitry and memory, OTN interfaces, OTN switch circuitry and memory, and OTN transceivers. The HRoT system reads, encodes, and transfers the HRoT keys for NFV server HRoT validation. The HRoT system also obtains and transfers HRoT data indicating the combinations of transceivers, routers, interfaces, switches, prefixes, wavelengths, and fibers used to transfer IP packets through machine 520.

In IP/WDM machine 520, the IP router and the WDM switch receive the southbound SDN control data. The IP router processes the southbound SDN control data to direct IP flows between the IP transceivers and the OTN interfaces. The WDM switch processes the southbound SDN control data to direct IP/WDM flows between the OTN interfaces and the OTN transceivers. The OTN transceivers exchange the IP/WDM flows over various optical wavelengths and fibers 501.

Figure 6:
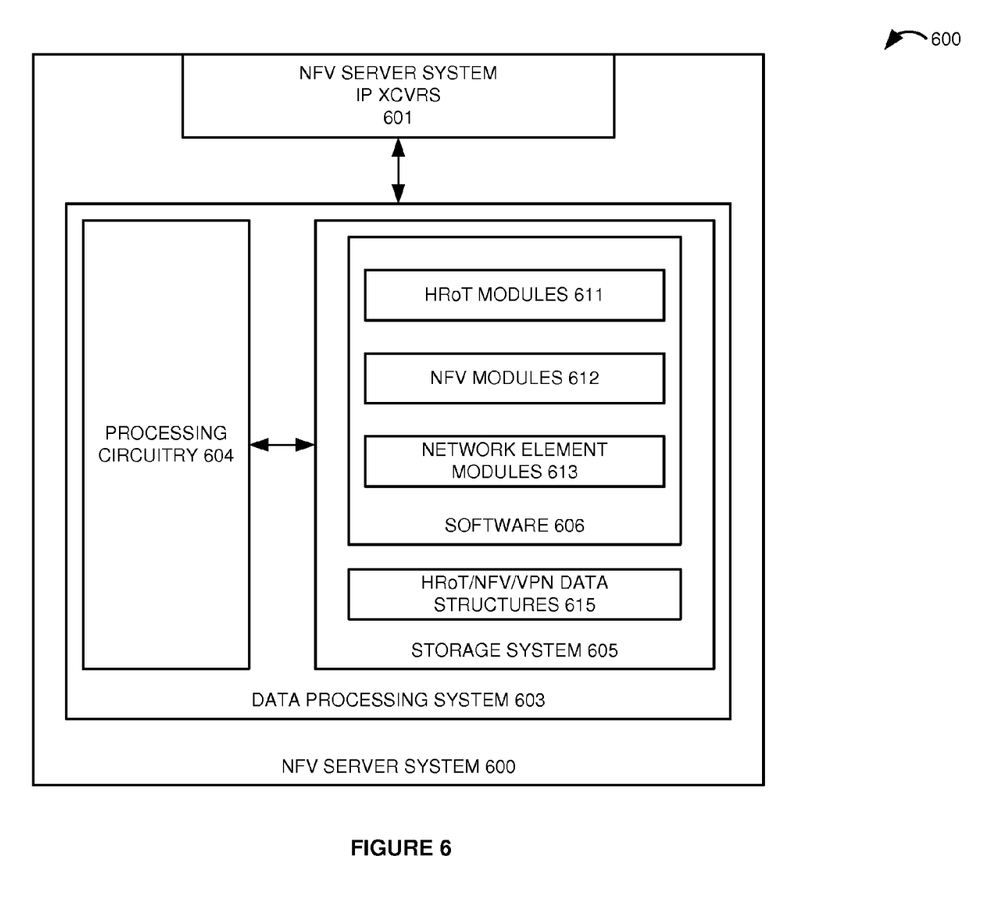
FIG. 6 illustrates an NFV server for IP/WDM networks with HRoT.

FIG. 6 illustrates NFV server system 600 for optical networks with HRoT. NFV server system 600 is an example of NFV servers 111-114 and 510, although these systems may use alternative configurations and operations. NFV server system 600 comprises IP transceivers 601 and data processing system 603. IP transceivers 601 comprise physical ports, digital signal processors, memory devices, software, bus interfaces, and the like. IP transceivers 601 exchange IP packets having NFV, SDN, and HRoT data in addition to exchanging user IP packets.

Data processing system 603 comprises processing circuitry 604 and storage system 605. Storage system 605 stores software 606 and HRoT/NFV/VPN data structure 615. Software 606 includes software modules 611-613. Some conventional aspects of computer system 600 are omitted for clarity, such as power supplies, enclosures, and the like. NFV server system 600 may be centralized or distributed.

In data processing system 603, processing circuitry 604 comprises server blades, circuit boards, bus interfaces and connections, integrated circuitry, and associated electronics. Storage system 605 comprises non-transitory, machine-readable, data storage media, such as flash drives, disc drives, memory circuitry, tape drives, servers, and the like. Software 606 comprises machine-readable instructions that control the operation of processing circuitry 604 when executed. Software 606 includes software modules 611-613 and may also include operating systems, applications, data structures, virtual machines, utilities, databases, and the like. All or portions of software 606 may be externally stored on one or more storage media, such as circuitry, discs, tape, and the like.

When executed by processing circuitry 604, HRoT module 611 directs circuitry 604 to maintain HRoT with IP/WDM machines. HRoT module 611 also directs circuitry 604 to execute hypervisor module 612. When executed by processing circuitry 604, hypervisor module 612 directs circuitry 604 to operate an NFV data processing environment for network element modules 613. Hypervisor module 612 also directs circuitry 604 to transfer NFV allocation data to HRoT modules for validation. When executed by processing circuitry 604 in the NFV environment, network element modules 613 direct circuitry 604 to apply services to IP packets exchanged with IP transceivers 601. Network element modules 613 also direct circuitry 604 to transfer HRoT data indicating usage-based associations of IP prefixes, WDM wavelengths, and optical fibers.

Figure 7:
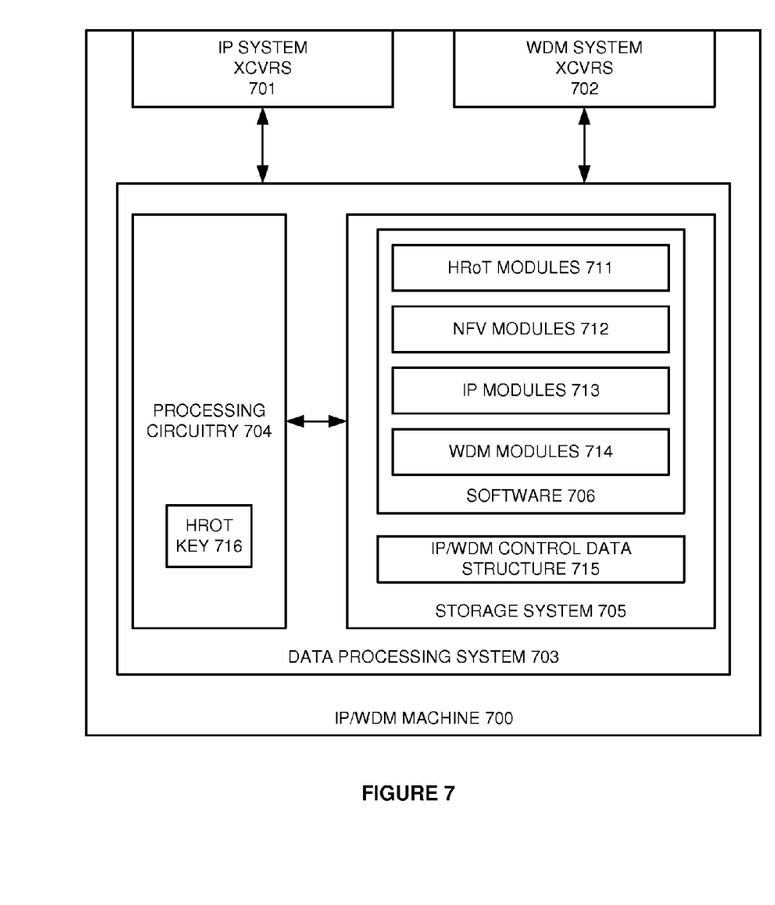
FIG. 7 illustrates an IP/WDM machine for networks with HRoT.

FIG. 7 illustrates IP/WDM machine 700 with HRoT. IP/WDM machine 700 is an example of IP/WDM machines 121-132 and 520, although these systems may use alternative configurations and operations. IP/WDM machine 700 comprises IP system transceivers 701, WDM system transceivers 702, and data processing system 703. IP system transceivers 701 comprise electromagnetic communication ports, digital signal processors, memory devices, software, bus interfaces, and the like. WDM system transceivers 702 comprise optical communication ports, optical/electrical interfaces, digital signal processors, memory devices, software, bus interfaces, and the like. Transceivers 701-702 exchange user IP packets and network IP packet having NFV, SDN, and HRoT data.

Data processing system 703 comprises processing circuitry 704 and storage system 705. HRoT key 716 is physically embedded in an electronically readable form in processing circuitry 704. Storage system 705 stores software 706 and IP/WDM control data structure 715. Software 706 includes software modules 711-713. Some conventional aspects of IP/WDM machine 700 are omitted for clarity, such as power supplies, enclosures, and the like. IP/WDM machine 700 may be centralized or distributed.

In data processing system 703, processing circuitry 704 comprises server blades, circuit boards, bus interfaces and connections, integrated circuitry, and associated electronics. Storage system 705 comprises non-transitory, machine-readable, data storage media, such as flash drives, disc drives, memory circuitry, tape drives, servers, and the like. Software 706 comprises machine-readable instructions that control the operation of processing circuitry 704 when executed. Software 706 includes software modules 711-713 and may also include operating systems, applications, data structures, virtual machines, utilities, databases, and the like. All or portions of software 706 may be externally stored on one or more storage media, such as circuitry, discs, tape, and the like.

When executed by processing circuitry 704, HRoT modules 711 directs circuitry 804 to provide an encoded version of HRoT key 716 to master HRoT systems or trusted modules. HRoT module 711 also directs circuitry 704 to execute NFV modules 712. When executed by processing circuitry 704, NFV modules 712 direct circuitry 704 to operate a virtualized data processing environment for IP modules 813 and WDM modules 714. NFV modules 712 direct circuitry 704 to supply NFV data to master HRoT systems or trusted modules. When executed by processing circuitry 704, IP modules 713 direct circuitry 704 to transfer IP packets based on IP/WDM control data structure 715. IP modules 713 also direct circuitry 704 to transfer HRoT data to master HRoT systems or trusted modules. When executed by processing circuitry 704, WDM modules 714 direct circuitry 704 to transfer WDM frames transporting IP packets based on IP/WDM control data structure 715. WDM modules 714 also direct circuitry 704 to transfer HRoT data to master HRoT systems or trusted modules.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:
1. An Internet Protocol/Wave Division Multiplex (IP/WDM) network to implement Hardware Root of Trust (HRoT) and Network Function Virtualization (NFV), the IP/WDM network comprising:

a plurality of IP/WDM machines configured to exchange IP packets between IP ports and WDM interfaces based on IP control data, exchange the IP packets between the WDM interfaces and WDM ports based on WDM control data, transmit and receive the IP packets from the WDM ports using different optical wavelengths, and transfer HRoT data indicating the optical wavelengths used to exchange the IP packets and indicating encoded hardware keys physically-embedded on the IP/WDM machines; and an NFV server configured to generate and transfer the IP control data and the WDM control data to the IP/WDM machines, receive the HRoT data, and process the encoded hardware keys and the optical wavelengths to validate HRoT status of the IP/WDM machines.

2. The IP/WDM network of claim 1 wherein:

the IP/WDM machines are configured to transmit the IP packets between the WDM ports over combinations of IP prefixes and the optical wavelengths and transfer the HRoT data indicating the combinations of the IP prefixes and the optical wavelengths used to exchange the IP packets; and the NFV server is configured to process the HRoT data to verify the combinations of the IP prefixes and the optical wavelengths to further validate the HRoT status of the IP/WDM machines.

3. The IP/WDM network of claim 1 wherein the IP/WDM machines are configured to transfer the HRoT data using one or more of the optical wavelengths that are dedicated to HRoT operations.

4. The IP/WDM network of claim 1 wherein the IP/WDM machines are configured to transfer the HRoT data using one or more IP prefixes that are dedicated to HRoT operations.

5. The IP/WDM network of claim 1 wherein the NFV server is configured to exchange a set of the IP packets between NFV server ports to apply data services to the set of the IP packets and to verify the NFV processing resources used to exchange and apply the data services to the set of the IP packets to validate the HRoT status of the NFV server.

6. The IP/WDM network of claim 1 wherein the NFV server is configured to exchange the set of the IP packets and apply the data services using combinations of IP prefixes and the NFV processing resources and verify the combinations of the IP prefixes and the NFV processing resources used to exchange and apply the data services to the set of the IP packets to further validate the HRoT status of the NFV server.

7. The IP/WDM network of claim 1 wherein the IP/WDM machines comprise Software Defined Network (SDN) data plane machines and the IP control data and the WDM control data comprise southbound SDN control data.

8. The IP/WDM network of claim 1 wherein the NFV server is configured to execute virtual Software Defined Network (SDN) controllers to generate the IP control data and the WDM control data.

9. The IP/WDM network of claim 1 wherein the NFV server is configured to execute virtual Software Defined Network (SDN) applications to control the generation of the IP control data and the WDM control data.

10. A method of operating an Internet Protocol/Wave Division Multiplex (IP/WDM) network to implement Hardware Root of Trust (HRoT) and Network Function Virtualization (NFV), the method comprising:

in a plurality of IP/WDM machines, exchanging IP packets between IP ports and WDM interfaces based on IP control data;

in the IP/WDM machines, exchanging the IP packets between the WDM interfaces and WDM ports based on WDM control data;

in the IP/WDM machines, transmitting and receiving the IP packets from the WDM ports using different optical wavelengths;

in the IP/WDM machines, transferring HRoT data indicating the optical wavelengths used to exchange the IP packets and indicating encoded hardware keys physically-embedded on the IP/WDM machines; and in an NFV server, generating and transferring the IP control data and the WDM control data for delivery to the IP/WDM machines; and in the NFV server, receiving the HRoT data, and processing the encoded hardware keys and the optical wavelengths to validate HRoT status of the IP/WDM machines.

11. The method of claim 10 wherein transmitting and receiving the IP packets comprises exchanging the IP packets between the WDM ports over combinations of IP prefixes and the optical wavelengths and further comprising transferring the HRoT data indicating the combinations of the IP prefixes and the optical wavelengths used to exchange the IP packets, and processing the HRoT data to verify the combinations of the IP prefixes and the optical wavelengths to further validate the HRoT status of the IP/WDM machines.

12. The method of claim 10 wherein transferring the HRoT data comprises transferring the HRoT data using one or more of the optical wavelengths that are dedicated to HRoT operations.

13. The method of claim 10 wherein transferring the HRoT data comprises transferring the HRoT data using one or more IP prefixes that are dedicated to HRoT operations.

14. The method of claim 10 further comprising exchanging a set of the IP packets between NFV server ports to apply data services to the set of the IP packets and verifying the NFV processing resources used to exchange and apply the data services to the set of the IP packets to validate the HRoT status of the NFV server.

15. The method of claim 10 further comprising exchanging a set of the IP packets and applying the data services using combinations of IP prefixes and the NFV processing resources and verifying the combinations of the IP prefixes and the NFV processing resources used to exchange and apply the data services to the set of the IP packets to further validate the HRoT status of the NFV server.

16. The method of claim 10 wherein the IP/WDM machines comprise Software Defined Network (SDN) data plane machines and the IP control data and the WDM control data comprise southbound SDN control data.

17. The method of claim 10 wherein generating the IP control data and the WDM control data comprises executing virtual Software Defined Network (SDN) controllers to generate the IP control data and the WDM control data.

18. The method of claim 10 wherein generating the IP control data and the WDM control data comprises executing virtual Software Defined Network (SDN) applications to control the generation of the IP control data and the WDM control data.

* * * * *